United States Patent [19]

Webb

[11] Patent Number: 5,713,607
[45] Date of Patent: Feb. 3, 1998

[54] PIPE COUPLING ASSEMBLY, SYSTEM AND METHOD

[75] Inventor: Michael C. Webb, Chester Springs, Pa.

[73] Assignee: Environ Products, Inc., Lionville, Pa.

[21] Appl. No.: 320,665

[22] Filed: Oct. 11, 1994

Related U.S. Application Data

[63] Continuation-in-part of Ser. No. 306,680, Sep. 15, 1994, abandoned.

[51] Int. Cl.⁶ .................................................. F16L 41/00
[52] U.S. Cl. .......................... 285/133.1; 285/156; 285/92; 73/40.5 R
[58] Field of Search ........................ 285/133.1, 133.2, 285/137.1, 92, 131, 156, 138; 405/52; 73/40.5 R

[56] References Cited

U.S. PATENT DOCUMENTS

| | | | |
|---|---|---|---|
| 3,980,112 | 9/1976 | Basham | 285/133.1 |
| 4,732,414 | 3/1988 | Inaba | 285/133.1 |
| 4,805,444 | 2/1989 | Webb . | |
| 4,870,856 | 10/1989 | Sharp | 285/133.1 |
| 4,886,305 | 12/1989 | Martin | 285/133.1 |
| 4,932,257 | 6/1990 | Webb . | |
| 5,005,613 | 4/1991 | Stanley | 285/133.1 |
| 5,042,290 | 8/1991 | Geisinger . | |
| 5,090,234 | 2/1992 | Maresca et al. . | |
| 5,157,958 | 10/1992 | Geisinger . | |
| 5,163,314 | 11/1992 | Maresca et al. . | |
| 5,220,822 | 6/1993 | Tuma . | |
| 5,297,896 | 3/1994 | Webb | 405/52 |
| 5,301,721 | 4/1994 | Hartman | 285/133.1 |
| 5,317,899 | 6/1994 | Hutchinson . | |
| 5,343,191 | 8/1994 | McAtemney . | |
| 5,343,738 | 9/1994 | Skaggs | 73/40.5 R |
| 5,384,714 | 1/1995 | Kidd . | |
| 5,390,532 | 2/1995 | Anthony . | |
| 5,398,977 | 3/1995 | Berger et al. | 28/133.1 |
| 5,408,420 | 4/1995 | Slocum et al. . | |
| 5,450,883 | 9/1995 | Payne . | |
| 5,456,502 | 10/1995 | Sharp | 285/133.1 |

FOREIGN PATENT DOCUMENTS

| | | | |
|---|---|---|---|
| 1276007 | 10/1961 | France | 285/133.1 |
| 1234163 | 2/1967 | Germany | 285/133.1 |
| WO 90 04157 | 4/1990 | WIPO . | |

OTHER PUBLICATIONS

Enviorflex™ The Flexible Double Wall Piping System Brochure, Sep. 1990.

*Primary Examiner*—Terry Lee Melius
*Assistant Examiner*—Heather Shackelford
*Attorney, Agent, or Firm*—Seidel, Gonda, Lavorgna & Monaco, PC

[57] ABSTRACT

A pipe coupling assembly for use with at least one terminal end of a fluid transfer pipe having an inner tubular member for transferring fluid, an outer tubular member, and an interstitial space therebetween. The pipe coupling assembly comprises a transition coupling for attachment to the pipe to provide a first path for the transfer fluid in the inner tubular member and a second path for the transfer pipe's interstitial space, and a transition fitting for attachment to the transition coupling to provide separate access to the transfer fluid and the transfer pipe's interstitial space.

32 Claims, 7 Drawing Sheets

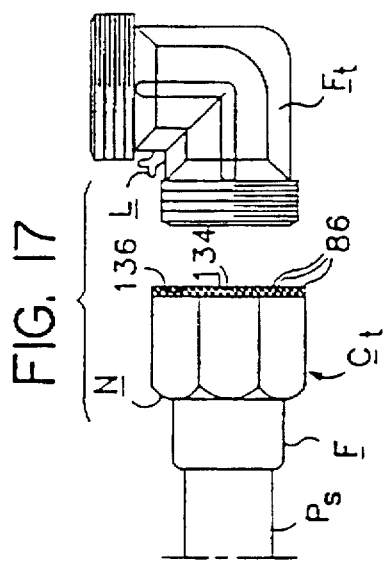
FIG. 17
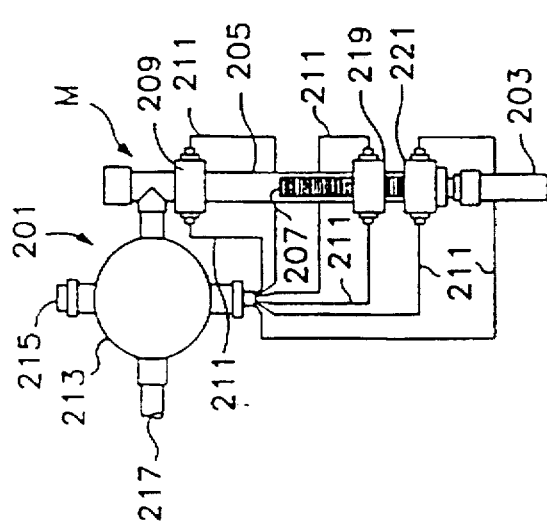
FIG. 1
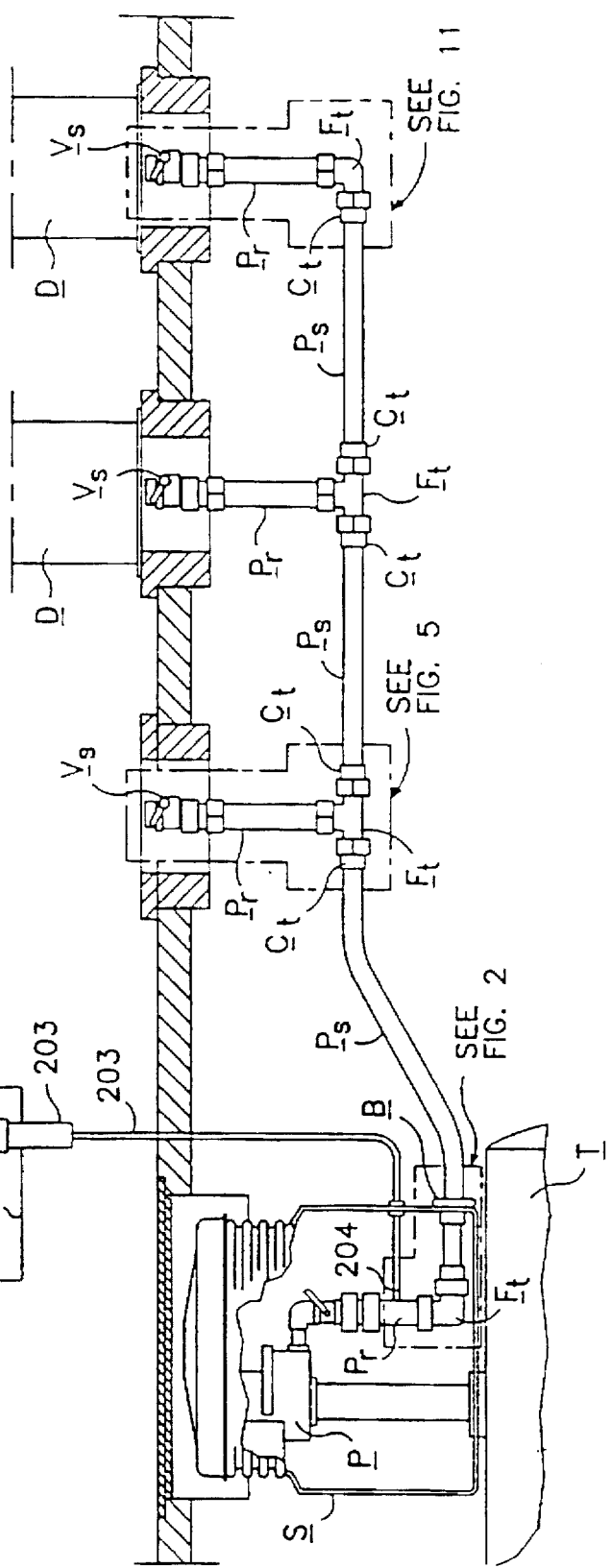

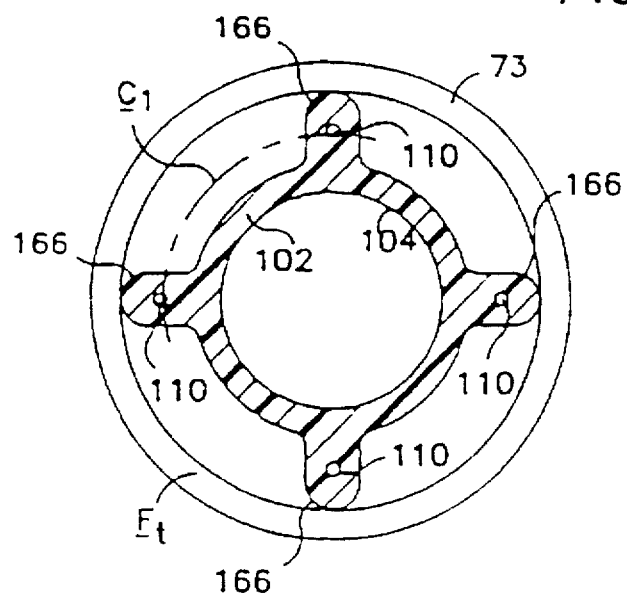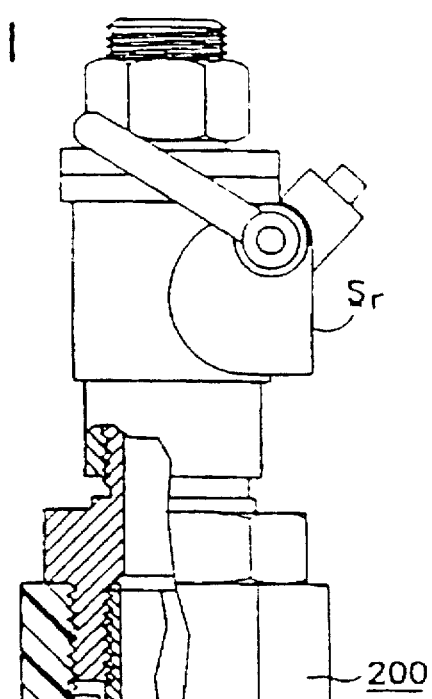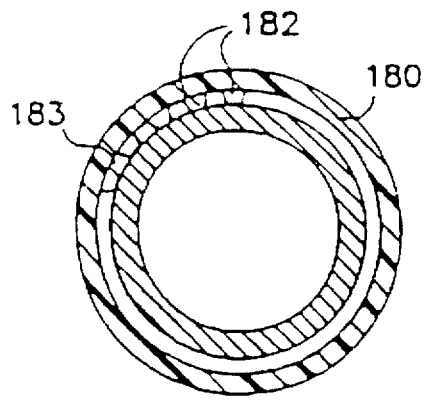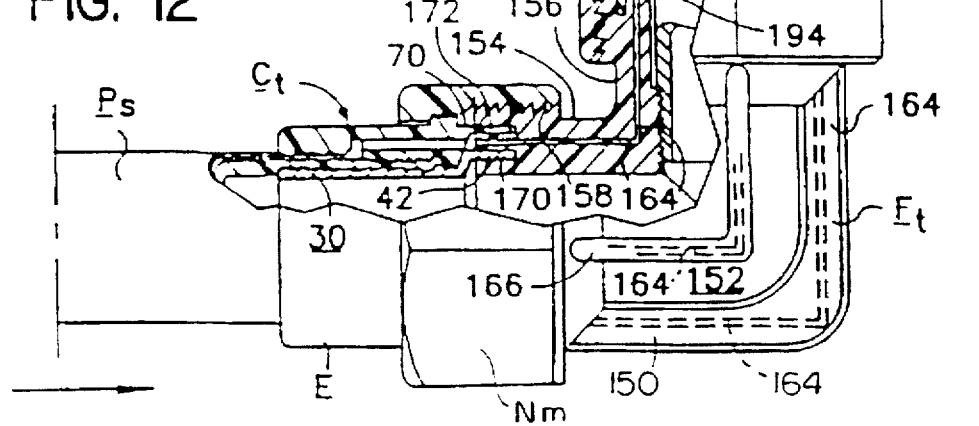

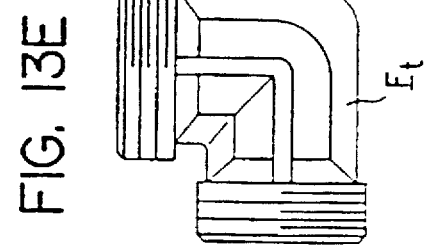
FIG. 13E
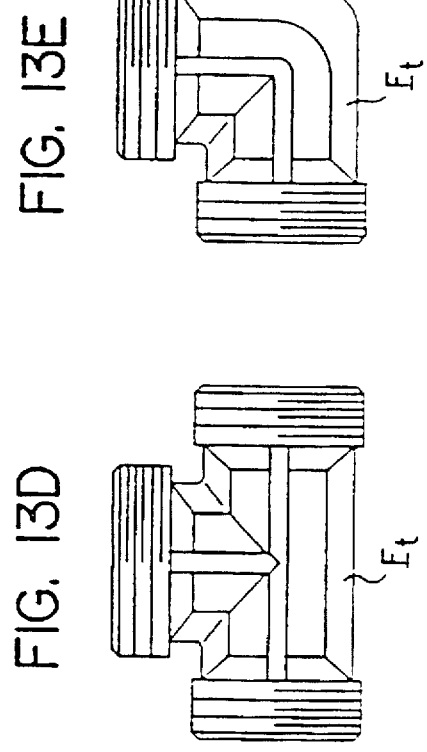
FIG. 13D
FIG. 13C
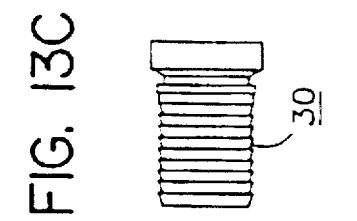
FIG. 13B
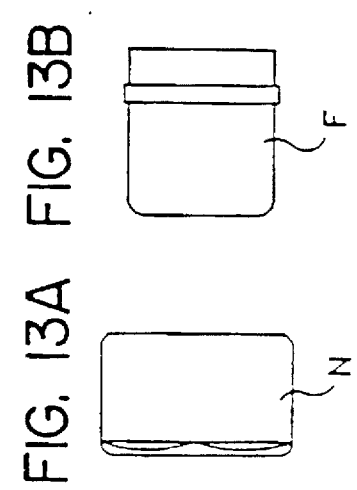
FIG. 13A
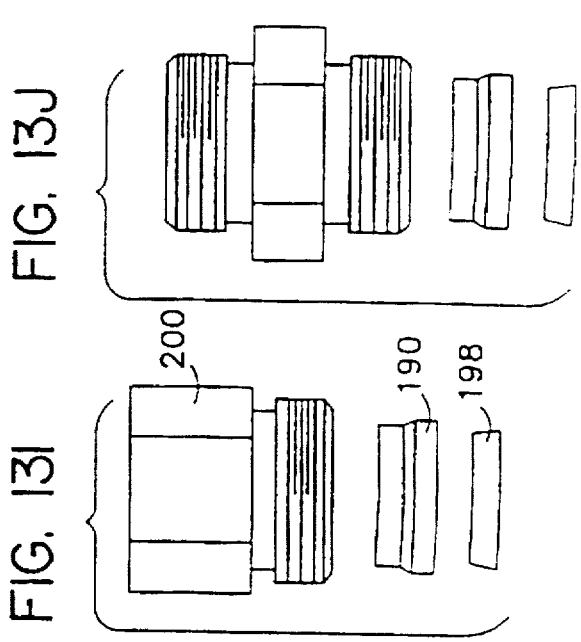
FIG. 13J
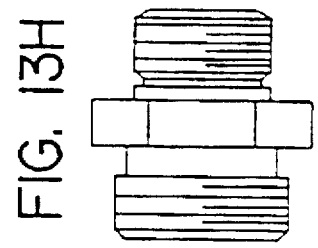
FIG. 13I
FIG. 13H
FIG. 13G
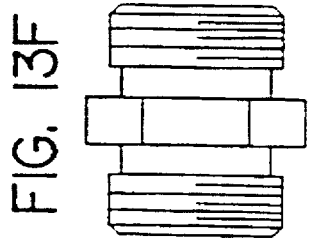
FIG. 13F

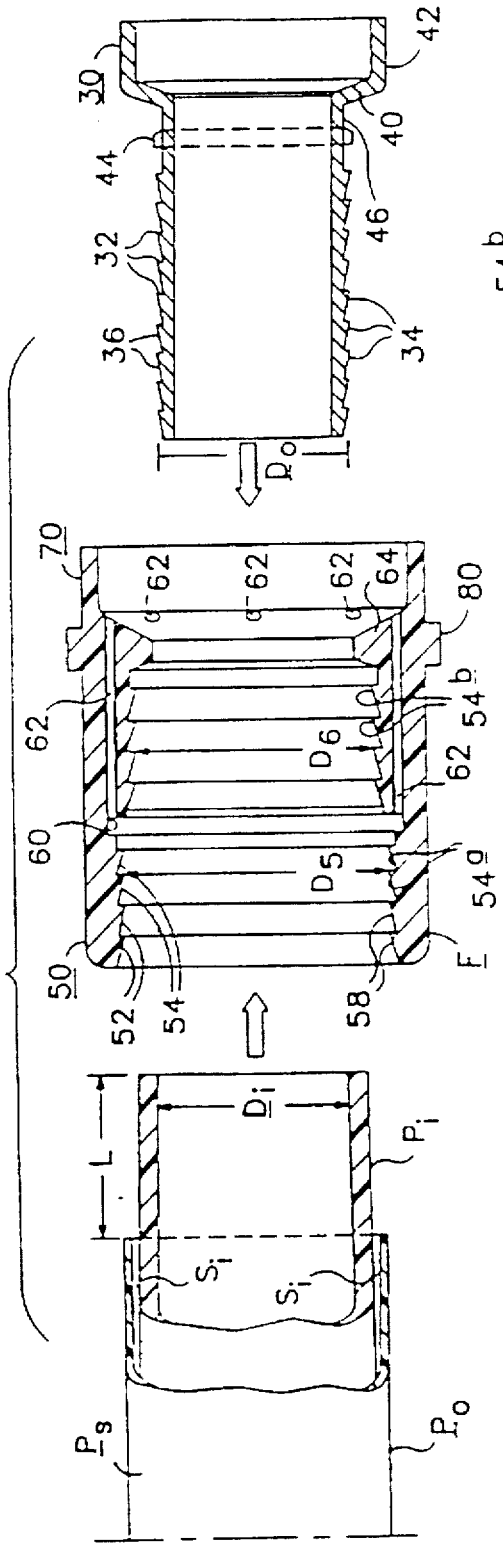
FIG. 14
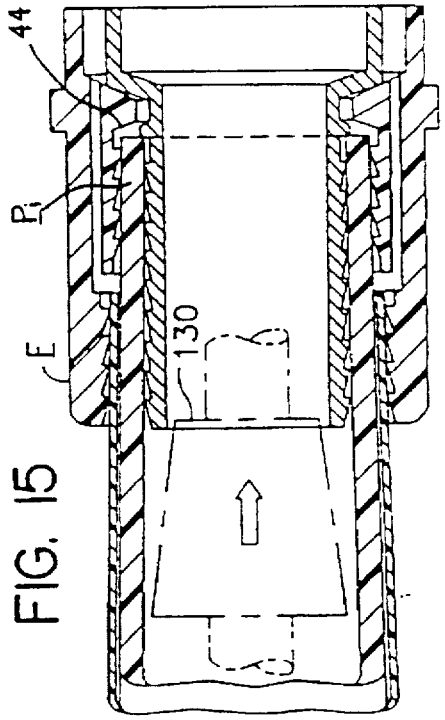
FIG. 16
FIG. 15

PIPE COUPLING ASSEMBLY, SYSTEM AND METHOD

This is a continuation in part of my application filed Sep. 15, 1994, and having Ser. No. 08/306,680, now abandoned, entitled PIPE COUPLING ASSEMBLY.

FIELD OF THE INVENTION

This invention relates to transition coupling and fitting assemblies for connecting segment of pipes into systems. More particularly, the invention relates to a new system using an assembly for coupling coaxial pipes, such as flexible coaxial pipes, of the type used in environmentally conscious petroleum transfer systems.

BACKGROUND OF THE INVENTION

The fundamental concern in the petroleum products industry relates directly to the basic nature of underground storage of hazardous fluids in large tanks. As a large tank is installed, it is normally filled first with gasoline, or whatever fluid is intended for its use, before earth is back filled and compacted around the tank so that settling is minimized. The added weight of the liquid assists in locating and anchoring the tank.

Over time, as the tank is emptied and refilled, the buoyancy of the tank changes. Rather than remain in one place as might be expected for a large tank packed into the ground, it has been discovered that the tank will shift. If the surrounding soil is wet or even worse subjected to underground water table pressure, the tank may seem to float underground. Even when the tank is effectively prevented from substantial movement, such as when the ground above the tank has been filled and covered with concrete or asphalt, the tank and all the appurtenances are subjected to considerable force. This phenomenon is defined by the term "shifting tank syndrome". Pipes, pumps, sumps and risers and all the myriad fittings and connections associated with the tank and with the pipe system are subjected to substantial stress. With these stresses comes the risk of failure of the tank and the appurtenances, especially of the joints and connections.

In the past, rigid pipes such as steel and fiberglass piping have been used for connecting varied tanks to pumps and other dispensing units. When the tanks experience the shifting tank syndrome over time, there was a real risk that pipes would burst, valves would fail, fittings would break, and sumps would crack thus failing to collect leaking fluids. In addition to these concerns, the tank, pipes, fittings, sumps and the like have been subjected to attack and degradation from the environment. Petroleum products and other hazardous materials are not compatible with many materials, so that transferring fluid from the tank to an above-ground pump subjects the internal portions of the system to potential leaks causing damage and degradation over a long period of time. An even greater concern is that the external ambient underground environment will also have a material adverse affect on the system. Metal, of course, can rust or corrode if it is not protected. Other materials such as rubber and plastic can degrade and eventually fail when exposed to certain transfer fluids and the ambient underground environment.

Because the petroleum equipment market is becoming more environmentally conscious, a significant shift has occurred from the use of rigid underground piping to the use of flexible piping. Rigid piping has a number of drawbacks, including the fact that it must be laid out accurately with precise angles using 90° elbows, 45° elbows and the like, even when the underground fuel storage tanks and pumps are not properly aligned with respect to each other. A primary reason for this shift from rigid to flexible piping is that flexible piping has many fewer pipe connections than rigid systems, since the flexible system can accommodate virtually any orientation or alignment of the pumps and tanks. With fewer pipe connections, the piping system is perceived by the industry to be more environmentally safe. Movement of the tank due to the shifting tank syndrome buoyancy forces are more easily accommodated by the use of flexible underground piping.

In addition to environmental concerns, flexible underground piping systems have also gained in popularity because these systems are more easily installed than rigid piping systems. Rigid systems require on-site measurements and cutting of each piece, along with the intensive labor involved in making two pipe connections every time the piping undergoes a change in direction. In some cases, flexible underground piping systems have been installed at a lower total cost than that of conventional rigid piping systems.

As part of the development of underground piping systems, it has been found necessary to provide a means of secondary containment for both the primary piping and for the associated fittings in order to provide a margin of safety in case of leaks or damage to the system. A secondary containment pipe offers external protection for the primary supply pipe from the ambient environment and from inadvertent damage, and further, provides for a method of containing the fluid from the primary pipe in the event of a rupture or leak of the primary pipe.

Presently, there are several types of double wall flexible piping systems on the market. These include systems with a small flexible pipe housed in a larger flexible containment pipe. One such system is described in U.S. Pat. No. 4,971,477 (the '477 Patent), wherein access chambers are separated by a secondary containment pipe which in turn is sized to accept a primary pipe within the secondary containment pipe. This system has a number of drawbacks, including the fact that the primary and secondary pipes are installed separately and that fittings are required for each of the two types of pipes. Moreover, because each of the pipes connects with an access chamber, a rapid and simple method of monitoring the condition of the primary piping would not be possible. Sumps of the type in the '477 Patent are capable of being monitored visually by an attendant, but the demand of other tasks eventually leads to fewer and fewer inspections. Most important is that leaks occur randomly, not only just prior to a visual inspection especially when such inspections grow less frequent over time.

As can be seen from the '477 Patent, flexible piping and its secondary containment, as described therein, requires a sump or access chamber each time sections of the flexible pipe are joined together. Most other systems also require a sump at each location where sections of flexible pipe are joined together. Other systems which have met with some degree of success using coaxial pipes and a secondary containment pipe are shown in U.S. Pat. Nos. 5,263,794 (the '794 Patent), and 5,297,896 (the '896 Patent) the entire disclosures of which are incorporated herein by reference. The advantages of flexible pipe systems are well disclosed by these systems. Nevertheless, it is still necessary to make individual connections each time sections of pipes are joined together.

The '794 and the '896 Patents provide various definitions that have become standard in the industry, for example, "tanks", "pumps", "dispensers" and the like. Also contained therein are extensive descriptions of double wall piping systems which provide for a secondary containment. In a system that employs secondary containment, a primary pipe is designated to carry the petroleum product or other hazardous material from the underground tank to the aboveground dispenser. The primary pipe, also known as the supply pipe, is located inside a larger, outer secondary containment pipe, known also as the containment pipe. Access sumps and other containment components are deployed around the tank pump, underneath the dispenser and at various junctions of piping.

Various types of double wall piping systems are generally disclosed in the '896 Patent and are good examples of the various systems. Among those systems are: (1) a non-flexible fiberglass supply pipe fully contained by a larger non-flexible fiberglass containment piping system; (2) a non-flexible fiberglass or steel supply pipe contained by a combination of larger, flexible and non-flexible polyethylene telescoping containment pipe; (3) a system like the preceding one but with only a larger, non-flexible polyethylene telescoping containment pipe; (4) a fiberglass or steel non-flexible supply pipe contained by a flexible membrane trench liner; (5) a system like the preceding one but with a non-flexible fiberglass trench line; (6) a flexible nylon composite supply pipe contained by a larger flexible polyethylene containment pipe; and (7) a flexible rubber composite supply pipe contained in a larger, flexible polyethylene composite containment pipe.

Some or all of those pipe systems have been utilized in the past. More recently, a significantly more effective pipe system has become available and has met with substantial success in the industry. This more effective pipe system's supply pipe is a flexible double wall pipe comprising an inner pipe and an outer pipe in radial communication with the outside surface of the inner pipe. Most preferred are pipes of this configuration that have internally facing longitudinal ribs on the inner surface of the outer pipe, or externally facing longitudinal ribs on the outer surface of the inner pipe. In either such design, a plurality of circumferentially spaced ribs extend radially from one pipe member to the other pipe member such that the ribs have a surface that confronts and snugly engages the other pipe to define an interstitial space between the two pipes.

The flexible double wall pipe described above is also disclosed in substantial detail in my co-pending Patent Application entitled ENVIRONMENTALLY SAFE UNDERGROUND PIPING SYSTEM, filed Jun. 1, 1993, and having Ser. No. 08/070,271 (the '271 Application), the entire disclosure of which is incorporated herein by reference. These '271 Application co-axial pipes are normally suited for use with hazardous material transfer pipe systems of the type described herein. The inner most layer is formed from a material highly resistant to the hazardous transfer fluid such as nylon, polyethylene or the like. The outer jacket of the double wall pipe, which is exposed to the ambient underground environment, is formed from a material highly resistant to the ambient underground environment that does not degrade over time such as nylon, polyethylene or the like. Between the outer wall of the primary pipe and the inner wall of the containment pipe is an intermediate layer, either in a form of ribs projecting from one surface to the other, or in a standoff layer formed from a cylindrical portion having circumferentially spaced ribs that define the interstitial space between the two pipes. As noted in the '271 Application, other layers can be present in the design, such as intermediate layers formed from materials of lower cost and further, the intermediate layers do not directly contact either the hazardous material being transported or the ambient underground environment.

The environment for both surfaces of the pipe is an important design aspect which needs to be considered. Product components which make up primary or secondary containment systems for hazardous liquids, and in underground applications particularly, must be designed, manufactured and independently tested to insure that they will not fail due to material deterioration. The selection of plastic resin used in these types of product components must be capable of withstanding long term exposure to a variety of anticipated conditions expected in this type of underground system. Some of the most common conditions to which the pipe would be exposed are contact with petroleum fuels, alcohol blended fuels, brown water, microbial growth, high humidity and heat. The product could fail due to degradation and the contained hazardous liquids could then escape into the environment if the wrong plastic were selected. For example, the use of primary and secondary containment products made of exposed polyethylene has already resulted in failures across the United States with reports of leaking products escaping into the surrounding environment. Some plastics, such as polyethylene and nylon, are excellent performers upon exposure to a wide variety of chemicals and conditions and do not chemically degrade when exposed to these chemicals and conditions. The appropriate plastic material, such as nylon or polyethylene, must not have an adverse reaction to water, micro-organisms, solvents, heat, oxygen, sunlight or burning. Products designed for primary and secondary containment of liquid fuels in underground storage and piping applications may expect to be subjected to at least four of these seven conditions at any given time.

The material must be resistant to hydrolysis, as it is expected that water and high moisture conditions will exist in underground burial applications both for contained and non-contained underground piping applications. Some forms of elastomers suffer an irreversible breakdown of the polyester chain when exposed for lengthy periods to hot water, moisture vapor or tropical climates. Exposure of the materials to solvents, such as alcohols found in oxygenated fuels and many fuel additives, must be expected to be present in both contained and non-contained underground piping applications. Tests are available to assure that the plastic materials that have been chosen will resist whatever hazardous material is being transported, such as 90% fuel/10% methanol mixtures. The exposure to micro-organisms must be expected in both contained and non-contained piping applications because of the existence of high moisture and heat. In this type of environment, micro-organisms multiply very rapidly and the enzymes released by these micro-organisms cause breakdown of certain chemical linkages and destruction of some forms of elastomers. Temperatures inside tank sumps have been found to exceed 100° F. due to solar heating of the steel manhole covers located just above the tank sumps.

In all instances, care should be taken to select the appropriate materials so that these materials are nondegradable when contacted by the specific environment in which they are put to use.

In addition to the tanks, pumps, pipes and dispensers that are used in these underground piping systems, there are a number of sumps used as part of the secondary containment system. One sump surrounds the pump on the tank and another sump is generally positioned below each dispensing system. Sumps typically have a base portion, a riser and a lid and are provided with means for permitting piping to enter and exit the sump. In a typical sump under a dispensing station, a supply pipe and secondary containment pipe will enter one side of the sump base to engage a tee fitting. The fuel is then directed upwardly to the dispensing pump and outwardly through the opposite side of the sump base to the next part of the system. Each time pipes are connected to one another, they are typically enclosed in a sump which, of course, requires an entry port, or so-called boot and an exit boot. Even with the use of flexible piping, the entire arrangement of a complex underground piping system involves the placement of many sumps and other fixtures, all of which are subject to attack by the ambient environment, transfer fluid and to the stresses caused by the shifting tank syndrome as previously described.

As can readily be appreciated, every pipe must eventually end. It then becomes necessary to connect that end of the pipe to either a pump or to a fitting joining two or more other pipes. For the most part the inner, or primary supply pipe, has been directly connected to fittings and the like, and other primary supply pipes have been connected to the other end or ends of the fittings. Merely connecting the inner supply pipes, as in the past, has been no different than connecting a single pipe system. In the evolution of piping systems as discussed above, the relationship of the outer, or secondary containment, pipe to the system has become more complex.

Initially, non-flexible pipes functioning as a containment pipe were attached to the sump or other chambers by merely enlarging the hole to permit entry or exit of the outer pipe from the sump, and later by various fastening and sealing method and devices. Initially, the interstitial space between the inner and outer pipes merely served as a conduit for fluid leakage to flow downhill into the next sump in the piping system, system. Leaks could come from either the inner pipe, spilt fuel, or from the secondary or outer pipe as ambient environmental liquids, such as water, penetrate the outer pipe.

Leak detection initially consisted of opening the sump chamber and inspecting the bottom of the sump for fluid accumulation. Of course, whatever can be visually inspected can be monitored automatically. Systems were proposed for monitoring the liquid levels in the bottom of sumps. However, every sump had to have a monitoring device since each sump by design represented a low point where fluid could collect. The difficulty in such two pipe systems can easily be seen by viewing FIG. 2 of '477 Patent where the outer pipe has a very limited, minor function of simply isolating the primary supply pipe from the ambient environment. Also shown in that Figure, is the way that the interstitial space between the primary pipe and containment pipe merely opened into the larger sumps without any recognition that there may be other purposes for the interstitial space. As is shown in FIG. 3 of the '477 Patent, the secondary containment pipe just serves as a housing or conduit for sections of the primary supply pipe which may be inserted or removed as desired.

In my co-pending '271 Application, I disclosed a connecting boot which substantially improves utilization of the interstitial space. Specifically, the connecting boot comprises a device which fits on one terminal end of a supply pipe, allowing the inner primary supply pipe to extend out from the boot while the outer secondary containment pipe terminates inside the boot. The exit end of the boot where the primary supply pipe exits is clamped to, or otherwise sealingly engages, the outer surface of the primary pipe. The entrance end of the boot, which fits over the exterior of the secondary containment pipe, is also clamped to, or is sealingly engaged with, the outer pipe surface. In between these two sealed ends is a chamber which communicates with the interstitial spaces of the two pipes and also communicates with a radially extending port. An elbow fitting and tube is usually provided which can be connected to the radially extending port and elbow fitting on the adjacent pipe, to which the primary pipe has been attached in a conventional manner. Thus, for the first time, it is possible to connect not only the interstitial spaces of two adjacent pipes but the interstitial spaces of an entire system which are connected to a single monitor. The entire interstitial space of all of the piping is then filled with a liquid to a level which registers in a predetermined range of the monitor indicating a securely contained system. When the level of the fluid in the interstitial space either drops below a certain amount or rises above a certain amount, indicating a change in the system, an alarm will sound.

The test boot, as the '271 Application connecting boot is called, has provided a substantial advance in the hazardous fluid piping system industry, primarily by permitting the interconnections of all of the system wide interstitial spaces. Nevertheless, as can be seen from the drawings illustrating the test boot, it is not as structurally solid as an access sump, for example, and thus still needs to be enclosed in a sump for protection. Even then, over time, it is significantly probable that the test boot may eventually leak and defeat the purpose of system wide interconnected interstitial spaces. Even with the greatest care in selecting the material from which the test boot is constructed and with substantial attention to the assembly of the test boot, shifting tank syndrome and other stresses can eventually weaken the boot, requiring that it be replaced or at least inspected on a regular, periodic basis.

All of the secondarily contained piping systems, access sumps and other equipment described above have been developed over a relatively short period of time. These developments have been in response to a continuously changing industry where environmental and safety regulations are becoming more strict and the industry itself is becoming more concerned. As these developments take place, various manufacturers and other organizations have developed their own design criteria in response to the concerns which they have at the time. Accordingly, none of the systems described above is truly effective in resolving the environmental issues while maintaining an efficient and effective fluid transfer piping system.

There are several additional considerations that need to be addressed in designing connections between sections of pipes, particularly flexible coaxial pipes. First, it is generally desirable to avoid connecting plastic to plastic, since vibration and time will cause a flow of the plastic material so that a truly effective connection is not always secured. A much better seal is achieved when metal and plastic are joined together since the metal does not melt or flow and the plastic tends to accommodate itself to the metal. However, in such cases it is necessary to protect the metal from the environment to avoid an otherwise potentially corrosive and unsafe condition. Coatings on metal often times peel off or become damaged during handling of the metal parts. Also, if the coatings are sufficiently thick, the necessary metal to plastic contact to establish an effective seal is not achieved.

As will be apparent from reviewing the above referenced patents, there is an interstitial space between the inner primary supply pipe and the outer secondary containment pipe. This interstitial space in the past has been used as a means for transferring leaked fluid into the containment sump or access chamber. Typically, in early systems, the access chambers were inspected on a regular basis to see if quantities of fluid had collected. This of course does not provide a rapid response to a major leak of fluid such as fuel from the primary supply pipe.

As shown in the '794 and the '876 Patents, the entire system is connected such that the primary pipe functions as a closed system, transporting fuel from the supply tank to the various dispensers. However, the interstitial space between the primary supply pipe and the secondary containment pipe is, at least in '477 Patent merely a conduit allowing leaked fluid to flow to an access chamber for observation. Although it is possible to monitor the conditions of one or all of the access chambers, for example by visual inspection, no simple method of monitoring the entire system is possible.

Accordingly, a principal object of the present invention is to provide an underground piping system which employs coaxial pipe, such as those pipes described above, which include a primary supply pipe and a secondary containment pipe, in which the interstitial space between the two pipes can be connected to the interstitial spaces in other segments of piping to form a continuous closed system of interstitial space.

Another object of the present invention is to provide a coupling assembly for use with coaxial pipes which permits coupling of the interstitial space between the coaxial pipes with corresponding interstitial spaces in other segments of pipe.

Still another object of this invention is to provide a coupling assembly which facilitates connection of a plurality of coaxial pipes without the use of containment chambers or sumps.

Yet another object of this invention is to provide a coupling assembly in which the seal between the pipes is accomplished by a plastic on metal seal in a manner that protects the metal portion of the seal from exposure to the environment so that the coupling assembly will operate effectively underground without additional protection from sumps and the like.

Finally, it is an object of this invention to provide an underground piping system that can be directly buried in the ground without the needs for sump devices at every junction of pipes or fittings and without the need for separate secondary containment of any type.

Other objects will appear hereinafter.

SUMMARY OF THE INVENTION

It has now been discovered that the above and other objects of the present invention may be accomplished in the following the manner. Specifically, an improved pipe coupling assembly has been discovered which permits junction of a variety of pipe segments, particularly those having an inner wall, an outer wall and an interstitial space between those walls. The pipe coupling assembly attaches to these pipe segments at the coupling end of the pipe segments and thereby defines a direction of flow from the pipe segments to the next part of the system. The system for transporting hazardous fluids in an underground piping system has also been discovered that provides many improved features. As part of the present invention, an improved coupling assembly, system and method are also provided for joining flexible co-axial pipe segments and their fittings.

The present invention provides the following advantages. The coupling assemblies of the present invention have a double wall design and provide for interstitial transition in ways which have previously not been possible. The seal is extremely effective, employing a double 0-ring seal and a mechanically locked seal. The mechanical closure further has a back-off restrictor locking lug device that prevents vibrations from causing back-off of the mechanical lock. The components of the present invention are formed from non-permeable, nondegradable plastic materials such as nylon and polyethylene, and all metallic parts are totally protected from the external ambient underground environment of the piping system. The coupling portion of the present invention effectively seals the inner tubular member and the outer tubular member simultaneously. Riser pipes formed from steel and other metals may be secondarily contained and dielectrically isolated from the environment.

One major advantage of the present invention is that it permits the interstitial space of the entire piping system to be interconnected into one closed system. Thus, the interconnected interstitial space can be subjected to pressurized air or preferably pressurized nitrogen, to test the entire system at one time. Moreover, liquid or gas interstitial monitoring is readily obtained using the present invention. The most important advantage of the present invention is that all couplings, fittings and connectors are non-metallic and nondegradable so that they may be buried directly in the ground without the need for any additional protection.

The present invention will provide a number of benefits to the industry. Installation will be much faster and more efficient, and the system will not corrode. The system can be directly buried in the soil, eliminating the need for costly containment chambers because the fittings, couplings and adapters are made of a impermeable plastic resin that prevents long term surrounding contamination. Additionally, the pipe coupling assembly, system and method is capable of withstanding stress from movement of the system as tanks are filled and emptied and as water tables effect the components of the system.

The present invention is suited for long term secondary containment of hazardous fluids which are transferred in underground systems. In terms of monitoring, the present invention provides for a totally contained, interconnected, interstitial space which is capable of withstanding higher internal pressure, in part because test boots have been eliminated. Further, this system can be used either alone or in conjunction with known fluid detection systems.

The coupling assembly includes a ferrule attached to the outer wall of the pipe segment at the coupling end. The ferrule has an outer annular ring extending from the coupling end of the pipe segment in the axial direction of flow. The ferrule also has a pocket which aligns with the interstitial space of the pipe segment to define and present a chamber at the coupling end for communication with other pipe segment interstitial regions via channels in the ferrule.

The coupling assembly further includes an insert, preferably made of metal, which is attached to the inner wall of the pipe segment at its coupling end. The insert, which is expanded into the inner tubular member wall, includes an inner annular ring extending from the coupling end of the pipe segment in the direction of fluid flow.

The second component of the coupling assembly is an externally threaded transition fitting which is to be attached to the ferrule. The transition fitting includes a channel which is aligned with the chamber of the ferrule. The transition fitting further includes an outer seal channel for sealing engagement with the outer annular ring on the ferrule. The transition fitting still further includes an inner seal channel for sealing engagement with the inner annular ring on the metal insert. By bringing the transition fitting into contact with the ferrule and metal insert, a metal to plastic seal is achieved. Moreover, the interstitial space from the pipe segment through the ferrule to the transition fitting is effectively sealed by the interaction of the annular rings and the sealed chambers. A final component of the coupling assembly is a coupling device for locking the coupling assembly, such as a swivel nut which is keyed to the ferrule to prevent removal in the axial flow direction, although it is removable in the direction opposite the axial flow.

The invention also includes a system as well as a method in which an underground source of liquid or fluid is connected to at least one dispenser for the fluid by a double wall coaxial pipe having an interstitial space, with the connection being accomplished using the coupling assembly described alone. A direct burial system is possible for the first time, using the present invention in its preferred embodiment.

The integrity of the system is tested by applying pressure or vacuum to the interconnected interstitial spaces of the pipe segments which have been formed into a closed system. Obviously, if the pressure or vacuum does not hold over a reasonable period of time, the system has one or more fluid leaks. The fittings and other components can then be inspected to locate the leaks. Moreover, after the entire system has been operating, the interstitial space may again be subjected to pressure or vacuum to test for leaks.

It is also possible, in accordance with this invention, to continuously monitor the interstitial space. To do so, a test fluid is added to the interstitial space of the closed system to fill the entire interstitial space. This test fluid is then monitored, either visually or automatically, so that a sudden or gradual increase or decrease in the amount of test fluid in the interstitial space will indicate that the system has failed and that a leak exists. For example, if the inner tubular member were to be damaged for whatever reason, a substantial increase in fluid in the interstitial space would occur, causing the fluid level in the monitoring device to rise. Similarly, if the outer tubular member were to break, the test fluid would leak into the ambient environment and the fluid level in the monitoring device would drop indicating that break in the system. In all cases, controls are provided to override any pumps in operation at the time, shutting down the system where necessary.

BRIEF DESCRIPTION OF THE DRAWINGS

These and other objects of the present invention of the various details of the operation and construction thereof are hereinafter more fully set forth with reference to the accompanying drawings, wherein:

FIG. 1 is a schematic illustration of an underground piping system for delivering petroleum products from an underground supply tank to various above-ground dispensing units incorporating a coupling system in accordance with the present invention;

FIG. 10 is a sectional view taken on lines 10—10 of FIG. 7;

FIG. 11 is an enlarged fragmentary elevational view of the details contained within the dot and dash box of FIG. 1 and designated as FIG. 11 with parts broken away to show the construction of the various elements including an embodiment of transition coupling and transition fitting in accordance with the present invention;

FIG. 12 is a sectional plan view taken on lines 12—12 of FIG. 11;

FIG. 13A, 13B and 13C, are various elements or components of a transition coupling in accordance with the present invention;

Figure 4:
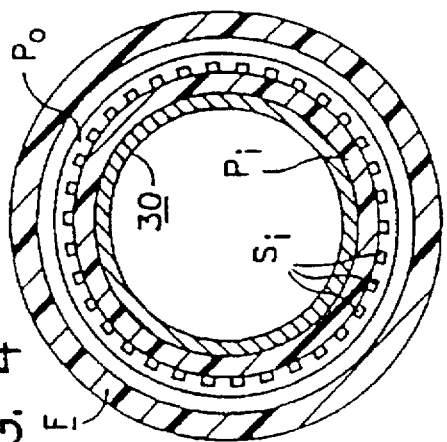
FIG. 4 is an enlarged sectional view taken along the lines 4—4 of FIG. 2 showing the interstitial spaces or channels in the co-axial piping segments.
Figure 3:
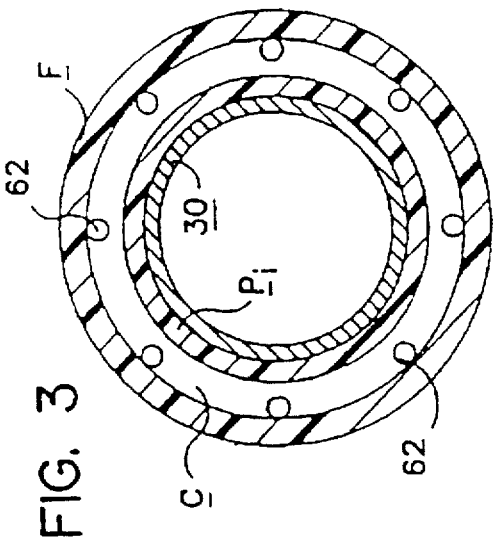
FIG. 3 is an enlarged sectional view taken along the lines of 3—3 of FIG. 2 showing details of the transition coupling in accordance with the present invention.

13D is a transition tee fitting in accordance with the present invention;

FIG. 13E is a side, elevational view of a transition elbow fitting in accordance with the present invention;

FIG. 13F is a side, elevational view of a connector fitting in accordance with the present invention;

FIG. 13G and 13H are female and male adapters;

FIG. 13I is an exploded view of a shear valve adapter;

FIG. 13J is an exploded view of the elements comprising a riser adapter;

FIG. 14 is an exploded view of parts shown in sections of the elements of the transition coupling prior to assembly to a co-axial pipe segment;

FIG. 15 is a sectional view showing the transition coupling prior to expansion of the coupling insert to secure the transition coupling to the co-axial pipe section;

FIG. 16 is a view similar to FIG. 15 after outward swaging of the coupling insert; and FIG. 17 is an exploded side elevational view showing a slightly modified transition coupling and associated pipe disengaged from a slightly modified elbow fitting, the modifications consisting of a circumferentially extending equally spaced anti-rotation saw teeth on the terminal end face of the swivel nut and a tang projection on the fitting that interengages with the saw teeth of the coupling, allowing free rotation in one direction only.

DETAILED DESCRIPTION OF THE PREFERRED EMBODIMENT

Referring now to the drawings and particularly to FIG. 1 thereof, there is shown schematically an underground piping system for conveying petroleum products from an underground storage tank to a plurality of above-ground dispensing pumps. The piping system incorporates a novel coupling means in accordance with the present invention. More specifically, the pipe coupling assembly of the present invention is particularly adapted for interconnecting the interstitial regions in the piping to provide a closed, continuous monitoring system for detecting leaks that has certain advantages over prior art piping systems used for this purpose.

Figure 2:
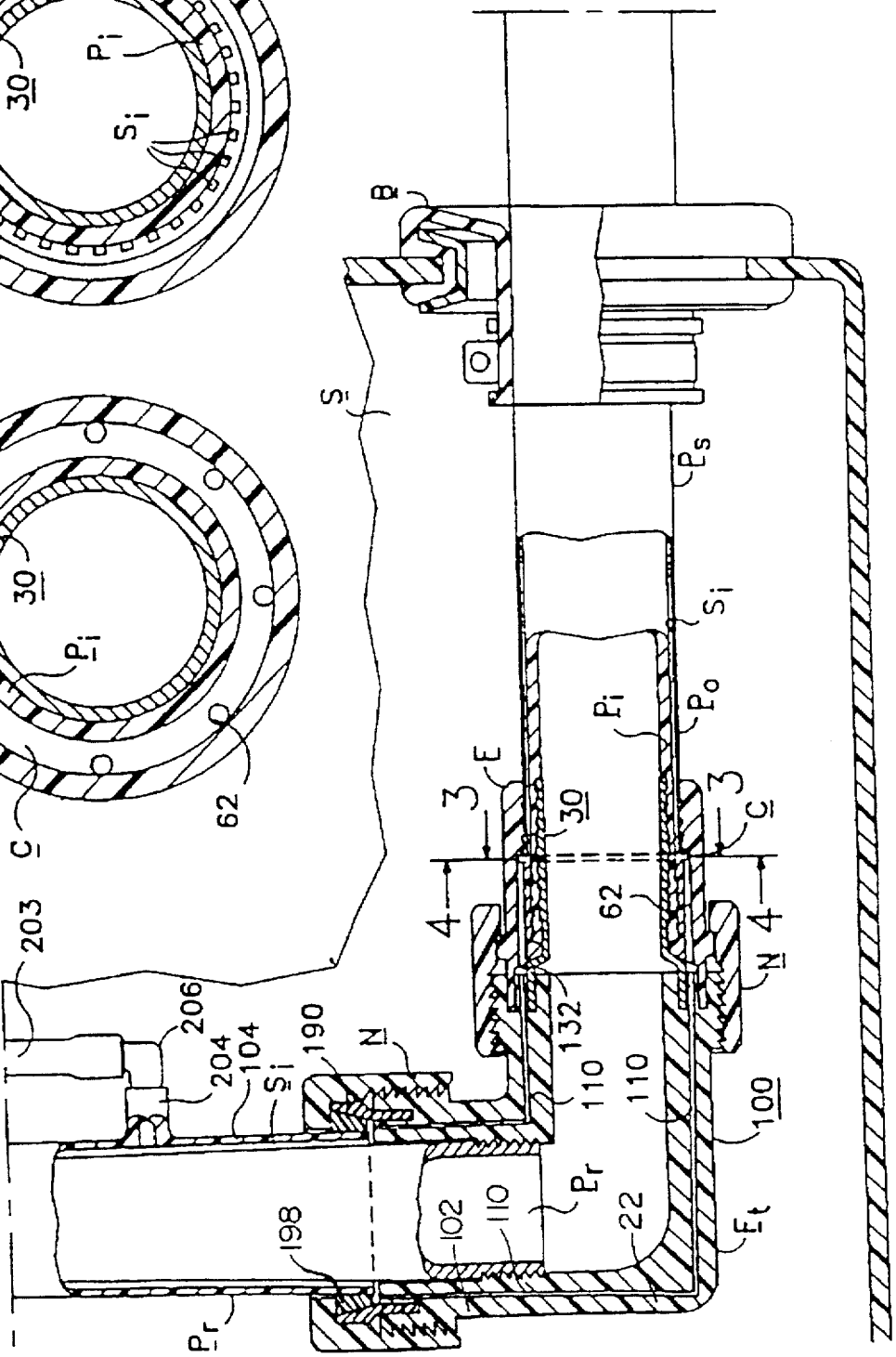
FIG. 2 is a an enlarged fragmentary sectional, elevational view of the detail contained in the dot and dash box of FIG. 1 and designated as FIG. 2 showing the details of a coupling in accordance with the present invention connecting a pipe riser to one of the underground piping system.

As best illustrated in FIG. 1, the basic elements of a pumping system include a storage tank T for containing a large quantity of a petroleum product, connected to a pump P housed in a sump S. As shown in FIG. 2, pipe segment $P_s$ extends through a hold in the wall of the sump S, and is flexibly mounted in a flexible entry boot assembly B. The pump P is connected to a piping system comprising a plurality of interconnected pipe segments $P_s$ and pipe risers $P_r$ to conventional product dispensers D located above ground. Shear valves $V_s$ are located in predetermined locations in the piping system to provide a means for shutting down delivery of petroleum products under certain operating conditions. A monitoring system broadly designated M is provided for detecting leaks in the underground piping system which essentially detects variation in the pressure of the interstitial spaces which are connected in a manner to define one closed circuit or path. The system provides early warning of leaks in the underground piping system and thereby to minimize chances of contaminating the underground environment.

The pipe segments $P_s$ are preferably co-axial pipes of the type shown and described in my co-pending application entitled ENVIRONMENTALLY SAFE UNDERGROUND PIPING SYSTEM, filed Jun. 1, 1993, Ser. No. 08/070,217, (the '217 Application) and commercially available under the trademark GEOFLEX™ which comprises an inner tubular member $P_i$ made of a nondegradable or inert material with respect to the petroleum products being handled in the piping system such as nylon or polyethylene and an outer tubular member $P_o$ made of a nondegradable or inert material when exposed to the ambient environment such as nylon or polyethylene and thus is suitable for direct burial applications. The co-axial pipe also has a series of circumferentially spaced longitudinally extending ribs defining a series of longitudinal interstitial spaces or passageways $S_i$ extending from end to end in the pipe segments $P_s$. Even though the present invention is shown and described in association with co-axial GEOFLEX™ pipe of the type described, the invention has application in other piping systems utilizing pipes having different or larger interstitial spaces between the elements of each piping section such as, for example, the space between a primary pipe housed in a secondary containment pipe as shown in the '477 Patent. Further, even though the interstitial space $S_i$ in the pipe illustrated and described herein is defined by longitudinally extending ribs, it is to be understood that the interstitial space can be defined by other means such as axially aligned spacing members or helically wound spacing members as long as the interstitial space is continuous and provides a continuous fluid flow channel between the ends of the pipe segments $P_s$.

The coupling assemblies of the present invention incorporate novel structure and means for connecting the pipe segments $P_s$ to facilitate monitoring of all of the elements of the underground piping system, including the coupling assemblies, utilizing a minimum number of parts which are easy and economical to assemble and are capable of direct burial applications without the need for utilizing additional secondary containments. To this end, the coupling assemblies incorporate novel arrangements of internal channels connecting the interstitial spaces $S_i$ of the pipe segments $P_s$ to one another in a closed circuit. The arrangement provides very precise and accurate monitoring which is capable of detecting leaks in the underground piping system.

The coupling assemblies comprise a transition coupling $C_t$ assembled to terminal ends of the pipe segments $P_s$ and a transition fitting $F_t$ in the form of tee fittings or elbow fittings to which the transition couplings $C_t$ can be readily assembled. The transition couplings $C_t$ and transition fittings $F_t$ having a novel arrangement of passageways and internal channels to fluidly link the interstitial spaces $S_i$ of the pipe segments $P_s$ in the manner described in more detail hereinafter. The transition couplings $C_t$ and the transition fittings $F_t$ are also characterized by novel features of construction and arrangement providing simple and effective sealing of the elements relative to one another, easy and quick application to pipe segments and assembly together at an underground site, and providing exceptional shear strength resisting possible failure when relative movements occur in the underground piping system due to settling or shifting of various components of the system such as the supply tank T or other components by the shifting tank syndrome.

Considering broadly the basic components of a coupling assembly in accordance with the present invention, the assembly comprises a transition coupling $C_t$ mounted on the terminal end of a pipe segment $P_s$ including a metal insert, a ferrule F circumscribing the outer peripheral surface of the outer tubular member $P_o$ of the pipe segment $P_s$ and a swivel nut N for securing the transition coupling $C_t$ to a transition fitting $F_t$. The components of the transition coupling $C_t$ and transition fitting $F_t$ which are exposed to the ambient environment are preferably made of a nondegradable material such as nylon or polyethylene. The transition coupling $C_t$ and transition fitting $F_t$ are provided with internal channels or passageways, ports, and chambers to provide a direct fluid communication between the interstitial space $S_i$ of the pipe segments $P_s$ which are connected together by the coupling assemblies whereby the components of the underground piping system can be monitored via the interconnected interstitial network.

Considering now more specifically the structural detail and arrangement of a coupling assembly in accordance with the present invention, and considering first the details of the transition coupling $C_t$, the transition coupling $C_t$ comprises an elongated hollow tubular sleeve member 30 engaging interiorly of the inner tubular member $P_i$ of the pipe segment $P_s$ which as illustrated in FIG. 14, is initially of an outer diameter $D_o$ less than the inner diameter $D_i$ of the inner tubular member $P_i$ to freely engage therein. The sleeve member 30 is preferably made of a metal such as stainless steel and other alloys which are deformable by a swaging operation to seat and firmly engage the transition coupling $C_t$ to the end of the pipe segments $P_s$ in a manner described in more detail below. The hollow tubular sleeve member 30 has a series of circumferentially extending axially spaced, beveled ribs 32 formed on its outer periphery defining teeth 34. Each tooth 34 has a rearwardly and outwardly beveled face 36. By this arrangement, when the sleeve 30 is expanded radially outwardly by swaging, the teeth 34 engage into the inner peripheral surface of the inner tubular member $P_i$ in the manner shown in FIG. 16 and the sleeve 30 is firmly locked in place once assembled. Additionally, even if the sleeve 30 initially fits the inner peripheral surface rather snugly, the direction of the beveled faces 36 is such that the sleeve 30 may be pushed into place rather easily.

As shown in FIG. 14, the inner end of the sleeve 30 has an offset, frusto conical outwardly directed wall 40 terminating in a short, axially directed circumferentially extending sealing flange or lip 42. A locating rib 44 projects radially outwardly from the outer surface of the sleeve 30. The locating rib 44 engages the outer axial end face of the inner tubular member $P_i$ of the pipe segments $P_s$ to locate the transition coupling $C_t$ in the proper position relative to the pipe segments $P_s$ to properly align a manifold in the ferrule F relative to the axial ends of the interstitial spaces $S_i$ in the pipe segments $P_s$ in a manner to be described in more detail below.

The rib 44 and frusto conical wall 40 define a circumferentially extending locating groove 46 defining a seat for a locating rib or flange on the ferrule F which aligns the ferrule F and sleeve 30 in a pre-determined axial alignment relative to one another to be described in more detailed hereinafter wherein the assembly of these components to the transition fitting $F_t$ are set forth.

Figure 7:
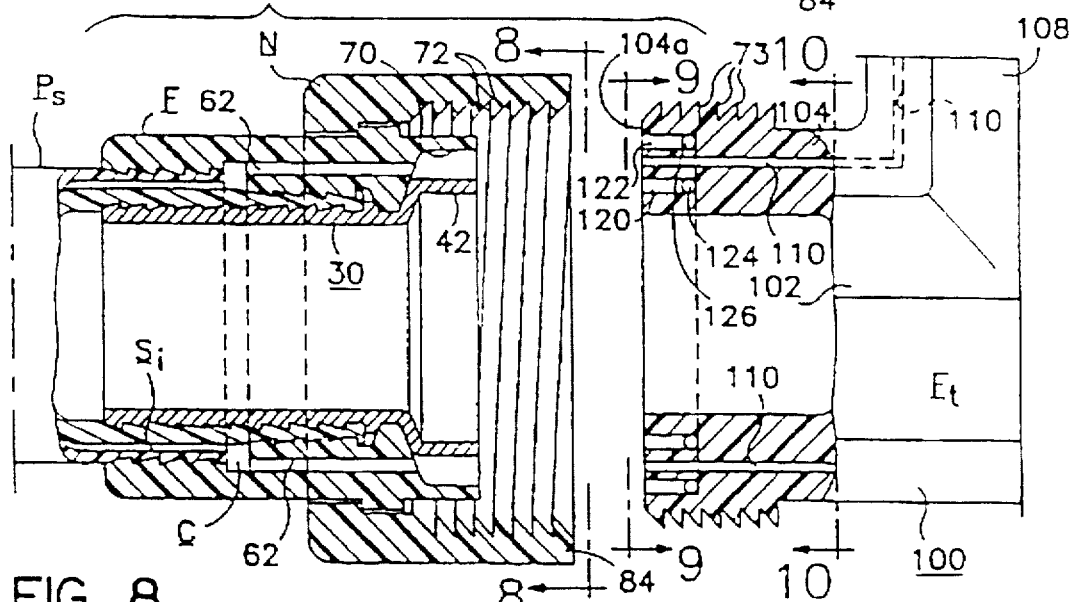
FIG. 7 is an exploded sectional view similar to FIG. 6, prior to assembly of the transition coupling to the transition tee fitting.
Figure 8:
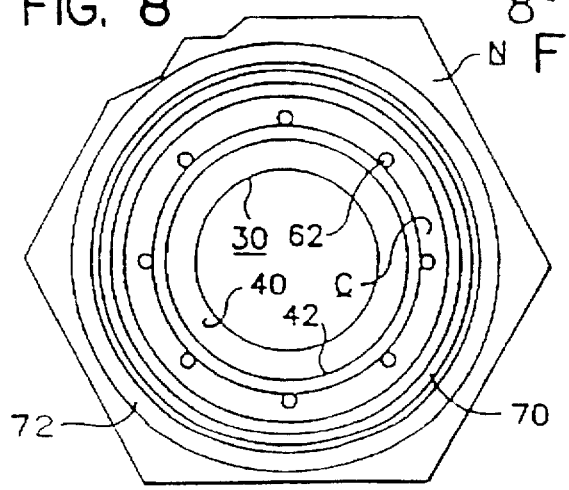
FIG. 8 is a view taken on lines 8—8 of FIG. 7, showing the axial end face of the transition coupling.
Figure 9:
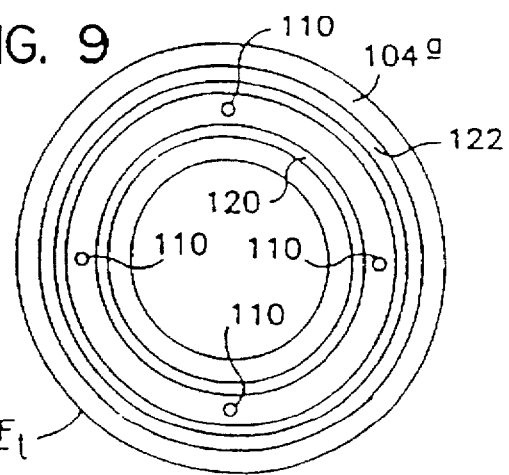
FIG. 9 is a view taken on lines 9—9 of FIG. 7, showing the axial end face configuration of the transition tee fitting.

Consider now more specifically the structural details of the ferrule F. As best illustrated in FIGS. 7 and 14, the ferrule F comprises an elongated hollow tubular sleeve member 50 having a series of circumferentially extending axially spaced inwardly beveled ribs 52 formed on its inner periphery defining teeth 54 for locking engagement with the outer peripheral surface of the pipe segments $P_s$. Each tooth 54 has a beveled rearwardly directed face 58 permitting easy application of the ferrule F over the outer peripheral surface of the pipe segments $P_s$ in one direction, an assembly direction, and, when fully assembled as shown in FIG. 16, resists axial displacement of the ferrule F to firmly lock the ferrule F in place in the assembled position.

The inner surface of the ferrule F as illustrated is of a stepped configuration defining an inner section of teeth $54^a$ having a predetermined diameter $D_5$ and a rearward section of teeth $54^b$ having a smaller diameter $D_6$ to snugly embrace the outer peripheral surface of the inner tubular member $P_i$ of the pipe segment $P_s$. The ferrule F has a circumferentially extending groove 60 at the juncture of the teeth segments $54^a$ and $54^b$ and a plurality of circumferentially spaced axial passageways 62, extending from the groove 60 to the inner axial end face of the ferrule F, the groove 60 defining an annular manifold or chamber C in the assembled relation as shown in FIGS. 7 and 15 communicating with the interstitial spaces $S_i$ of the pipe segment $P_s$ to provide a direct fluid communication from the interstitial spaces $S_i$ through the ferrule F.

A circumferentially extending radially inwardly directed rib 64 is provided on the inner end of the ferrule F which engages in the locking groove 46 of the sleeve 30 to properly align the sleeve 30 and ferrule F relative to one another and to locate it in the desired position on the axial end of a pipe segment $P_s$ in a manner described in more detail below.

The ferrule F also includes a rearwardly directed circumferentially extending lip 70 disposed radially outwardly of the axial passageways 62 which overlies and is concentric to the inner flange 42 of the sleeve 30 to define a pocket 68 therebetween.

Figure 6:
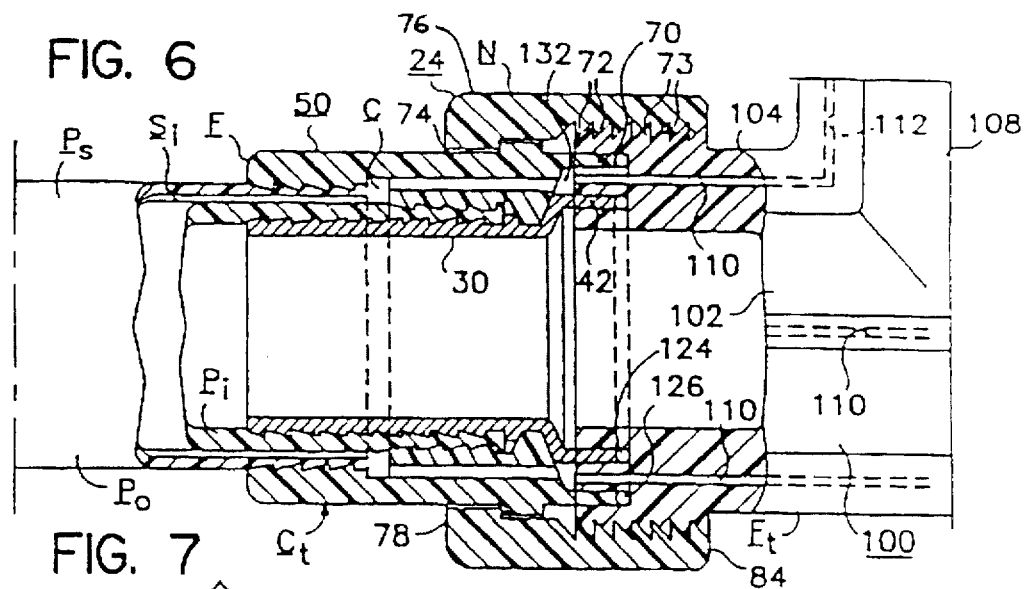
FIG. 6 is an enlarged fragmentary sectional view of the details contained within the dot and dash box of FIG. 5 and designated FIG. 6 of the transition coupling and a portion of the tee fitting.

The swivel nut N as best illustrated in FIG. 6 has a series of spiral threads 72 formed therein which interengage and mate with spiral threads 73 on the transition fitting $F_t$ to secure the coupling elements in place in a manner shown in FIG. 6. The swivel nut N has an opening 74 in its outer one end to freely fit over the ferrule F. The opening 74 is spaced inwardly from the side wall or skirt 76 to define a circumferentially extending shoulder 78 which abuts an outwardly directed lug 80 (FIG. 14) on the ferrule F to hold the parts of the transition coupling $C_t$ in place in the manner shown in FIG. 6 when the swivel nut N is threaded onto the transition tee fitting in the manner shown.

As shown in FIG. 17, the inner axial end face 84 of the swivel nut N may be provided with a series of rachet teeth 86 which cooperate with a locking lug L on the transition fitting $F_t$ when the parts are fully seated to lock the parts of the coupling in the assembled relation.

Figure 5:
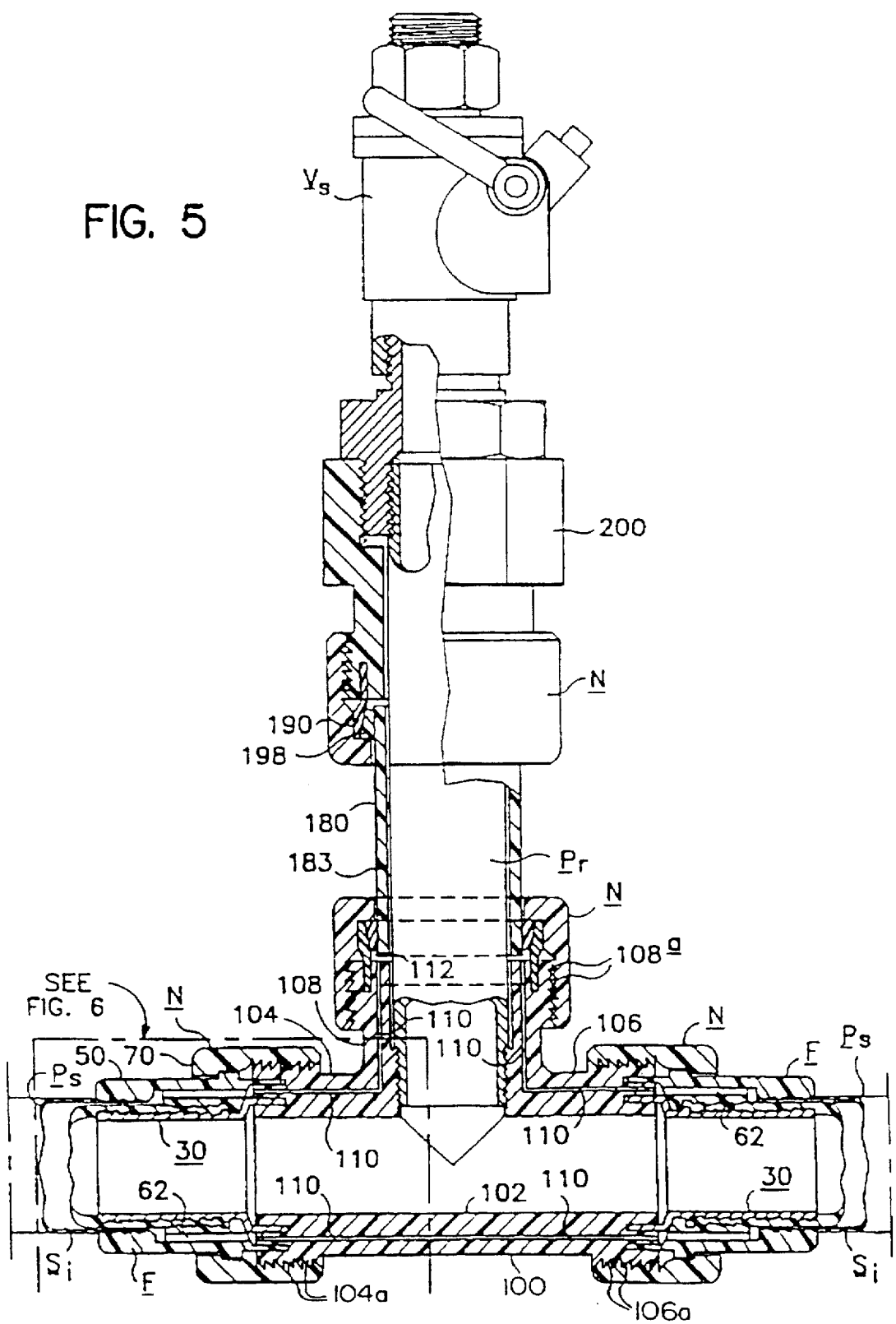
FIG. 5 is an enlarged fragmentary sectional, elevational view of the detail contained within the dot and dash box of FIG. 1 and designated FIG. 5 showing details of the transition coupling and T transition fitting;.

There are various types of transition fittings $F_t$ as illustrated in the drawings. Consider first the structural arrangement and details of a transition tee fitting $F_t$ generally designated by the numeral 100 adapted for connecting pipe segments $P_s$ in the underground piping system to one another and to a pipe riser $P_r$, in the manner illustrated for example, in FIG. 5. To this end, the tee fitting 100 comprises a T-shaped hollow body 102 having a pair of horizontally aligned legs 104 and 106 and a vertically disposed leg 108. The outer terminal ends of the legs are provided with spiral threads $104^a$, $106^a$ and $108^a$ respectively, cooperatively engagable by a swivel nut N to secure the elements of the coupling in the manner illustrated. A plurality of through ports or channels 110, in the present instance four (4) is provided in the body portion of the tee fitting 100 which extend between the opposing axial end faces $104^b$ and $106^b$ of the horizontal legs 104 and 106 of the tee fitting 100. A plurality of through ports or channels 112 are also provided in the body 100 of the tee fitting which extend from the axial end faces of the horizontal legs 104 and 106 of the tee fitting 100 to the axial end face $108^b$ of the vertical leg 108. In the present instance, the through ports or channels 110 and 112 are disposed on a circular trace $C_1$ having generally the same diameter as the axial passageways 62 in the ferrule F so that they are generally axially aligned in the same plane in the assembled relation as shown in FIG. 5. This relationship is also true of the through ports or channels 112.

As best shown in FIG. 7, a pair of radially spaced, circumferentially extending pockets 120 and 122 are formed in the opposing axial end faces of the horizontal legs 104 and 106 of the tee fitting 100 which straddle the through ports or channels 110 and 112. Flanges 42 and 70 of the transition coupling $C_t$ engage in the pockets 120 and 122 when the coupling assembly is fully assembled. O-rings, 124 and 126 are mounted in the pockets 120 and 122, respectively, to provide a tight, sealing engagement of these parts to resist leakage from the interstitial region thereby providing highly accurate monitoring in the manner described herein.

In the present instance, the peripheral wall of the vertical leg 108 of the tee fitting 100 is threaded to facilitate assembly of the pipe riser $P_r$. Vertical leg 108 is also provided with external screw threads to accommodate a modified form of swivel nut N and a suitable seal forming part of the connection to the pipe riser $P_r$.

Consider now assembly of a co-axial pipe $P_s$ in a piping system of the type shown to the horizontal legs 104 and 106 of the tee fitting 100. The outer tubular member $P_o$ of the pipe segment $P_s$ is prepared for application of the transition coupling $C_t$ by trimming the outer tubular member $P_o$ to expose a portion of the inner tubular member $P_i$ at its axial end. The axial length L is predetermined so that when the pipe segment $P_s$ is inserted into the annular space between the ferrule F and the insert sleeve 30, the inner edge of the axial passageway 62 is generally aligned with the axial end face of the trimmed outer tubular member $P_o$ to provide a circumferentially extending alignment of groove 60 with the interstitial spaces or channels $S_i$ at one end of the pipe section $P_s$. It is noted that when the pipe section $P_s$ is positioned between the ferrule F and the sleeve 30, the axial end of the inner tubular member $P_i$ abuts the locating rib 44 on the sleeve 30 to position the manifold or groove 60 in the manner described (see FIG. 15). In this position, a swaging tool 130 is pulled through the sleeve 30 to press it radially outwardly so that the confronting teeth $54^a$ and $54^b$ on the ferrule F and the teeth 34 of sleeve 30 penetrate the inner and outer tubular members $P_i$ and $P_o$ of the pipe segments $P_s$ to firmly lock the parts in place.

The circumferentially extending flanges 42 and 70 of the ferrule F and sleeve 30 are then aligned with the circumferentially extending pockets 120 and 122 in the axial end face of the horizontal legs 104 and 106 of the tee fitting 100 and pressed axially to seat in respective pockets 120 and 122. The swivel nut N is then rotated in a locking direction to fully seat the flanges 42 and 70 in the pockets 120 and 122, respectively against the O-rings 124 and 126, respectively. In the fully assembled position shown in FIG. 6, a circumferentially extending chamber 132 is formed at the juncture of the axial passageway channels 62 in the ferrule F and the circumferentially spaced transition channels 110 and 112 in the tee fitting 100 to ensure a fluid communication between the interstitial spaces $S_i$ of the pipe segments $P_s$ through the transition coupling $C_t$ and the transition tee fitting 100.

During application of the transition coupling $C_t$ to the transition fitting $F_t$, in this case, an elbow (See FIG. 17), the back-off locking restrictor locking lug L rides on the cam faces 134 on the peripheral surface on the inner axial end face 84 of the swivel nut N and engages behind a shoulder 136 to lock the transition coupling $C_t$ in place relative to the transition fitting $F_t$ when fully seated. It is noted that the interengaging threads 72 of the swivel nut N and those on the tee fitting 100 are preferably large threads to facilitate easy turning of the swivel nut N by hand, which is recommended to initially seat the parts. When fully seated by hand, it is recommended to apply no more than a quarter turn with a conventional wrench to fully seat the parts.

As noted previously, the parts are relatively easy and quick to assembly and provide a good seal ensuring fluid communication between the interstitial spaces $S_i$ in the pipe segments $P_s$ in the system and a coupling assembly which is able to withstand high shear forces. This is an important consideration in underground piping systems where flexibility and relative movements of the parts are needed to accommodate changing underground conditions such as shifting tank syndrome in the manner described previously.

There is shown in FIGS. 10-12 inclusive, another embodiment of coupling assembly of the present invention for connecting various elements of an underground piping system. The coupling assembly comprises a transition coupling $C_t$ and transition fitting $F_t$ in accordance with the present invention. The transition coupling $C_t$ is identical to that described previously, and accordingly, the same reference numerals used previously are applied here. However, in the present instance, the transition fitting $F_t$ is an elbow fitting generally designed by the numeral 150 adapted for use in connecting a pipe segment $P_s$ to a pipe riser $P_r$ at the last station in the system in the manner illustrated in FIG. 1. Thus, the elbow fitting 150 comprises a generally hollow body portion 152 having generally right angularly disposed leg portions 154 and 156. Each of the leg portions have external screw threads 158 and 160 for receiving swivel nut N type fasteners and of the type described previously. The leg portion 156 is internally threaded so that a pipe riser $P_r$ can be threadedly connected to the elbow 150 as shown.

Ports or connecting channel 164 are provided in the elbow fitting 150 which, as illustrated, extend between the axial end faces of the right angularly disposed legs 154 and 156 of the fitting. In the present instance, the body portion 152 of the elbow fitting 150 is generally of a tubular configuration and the through ports or channels 164 are provided between radially outwardly directed flanges 168 formed integrally in the outer peripheral surface of the body portion 152. In the present instance as illustrated in FIG. 10, there are four circumferentially equally spaced webs 166 for the through ports or channels 164.

The axial end face of the leg portion 154 is provided with a pair of radially spaced circumferentially extending pockets 170 and 172 for receiving the flanges 42 and 70 of the insert sleeve 30 and ferrule F, respectively. As described previously, O-rings 124 and 126 are mounted in the pockets 170 and 172, respectively to provide a good seal when connected to a pipe segment $P_s$ in the manner described previously.

FIG. 11 shows the details of a system for monitoring the pipe riser $P_r$ by fluidly connecting it to the closed network linking the interstitial spaces $S_i$ of the pipe segments $P_s$ and the ports, channels and passageways interconnecting the interstitial spaces $S_i$ of the pipe segments $P_s$ with one another through the transition couplings $C_t$ and transition fittings $F_t$ of the present invention. Thus, a tubular jacket 180 is provided which circumscribes the pipe riser $P_r$ and has a plurality of circumferentially spaced radially inwardly directed longitudinal ribs 182 defining channels (See FIG. 12) 183 between the tubular jacket 180 and pipe riser $P_r$. As illustrated in FIG. 11, these channels 183 are in fluent communication with the through ports or channels 164 in the elbow fitting 150, and the juncture or transition area 168 of the ports and channels 183 are sealed by a sealing collar 190 having a circumferentially extending lip 192 which engages in a circumferentially extending pocket 194 formed in the axial end face of the elbow fitting 150 located radially outwardly of the through ports or channels 168 in the manner shown. The sealing collar 190 has a frusto conical inner face 196 which engages a wedge 198 thereby providing a tight seal in the area between the outer peripheral surface of the tubular jacket 180. The modified swivel nut $N_m$ interengage the parts in the manner shown in FIG. 11.

A shear valve adapter broadly designated by the numeral 200 connects the upper end of the pipe riser $P_r$ to the shear valve $V_s$ in the manner illustrated. A sealing collar 190 and wedge 198 and modified swivel nut $N_m$ provide a tight seal at the upper end of the tubular jacket 180 to the shear valve adapter 200. The shear valve adapter 200 may be provided with a test port, not shown, for communicating with the interstitial region between the shear valve adapter 200 and the pipe riser $P_r$. This provides a means for checking the integrity of the interstitial region immediately after installation of the underground piping system and periodically thereafter as desired or needed.

The pipe riser $P_r$ connecting the vertical legs of the tee fittings 100 to shear valves $V_s$ in the other parts of the system and the pipe riser $P_r$ connecting the pump P to the first pipe segment $P_s$ in the sump S are likewise provided with monitoring means as described above including the jacket 180 and shear valve adapter 200.

Shown in FIG. 1, is a device for testing the integrity of the primary pipe segments and the transition fittings in a totally closed system. The test assembly, shown generally by the reference number 201, includes an alarm system and level sensing system. Tube 203 extends vertically to orient an observation tube 205 with respect to a fixed point in space. Tube 203, as shown in FIG. 2, attaches to a fitting 204 via an elbow 206 for direct connection to the interstitial space $S_i$ in riser pipe $P_r$. This monitoring device 201 can be placed anywhere, but it is preferred to locate the monitoring device in the station proximate the control panel or at other places of convenient access to the operator of the station. Alternatively, of course, the monitoring system can be placed in the primary sump or in any other location as desired.

As shown in FIG. 1, the level of test liquid 207 in the observation tube 205 is adjusted so that during normal operation it is below sensor 209. Sensor 209 is connected by fiber optic cable 211 to a control box 213. Control box 213 includes an indicator light 215 and further electrical lines 217 to at least the primary pump for the system so that pumping can be shut down during an emergency. Control box 213 contains conventional processing equipment as well as the alarm and shut down circuitry.

Also provided are sensors 219 and 221 which are positioned below the level 207 of the liquid in observation tube 205. If the system begins to leak for whatever reason, the test liquid level will drop below middle sensor 219. At this point, a signal will be generated in the same manner when the liquid level 207 exceeded sensor 209, and the fiber optic cable 211 will transmit that signal to the control box 213. An alarm will be generated, but the system will not be shut down since test liquid passing sensor 219, but not passing sensor 221, indicates that the leak is a slow leak. However, if the test liquid level 207 passes sensor 221 as well, which would be the case if a rapid leak would be taking place, the alarm would sound and system shut down would take place to prevent or slow further leakage until repairs could be made. Because the fluid being pumped is under pressure that is higher than the pressure of the liquid in the interstitial space $S_i$ and thus in observation tube 205, a rise in liquid level 207 will indicate that the inner tubular member Pi has begun to leak fluid under pressure into the interstitial space $S_i$. Sensor 209 will thus indicate such a leak. Similarly, since the pressure of the liquid in the interstitial space $S_i$ will normally be greater than the ambient pressure outside the system, a drop of level 207 below sensors 219 and 221 will indicate that the outer tubular member $P_o$ has a leak.

Thus, the connection via fitting 204 in FIG. 2 from the interstitial space $S_i$ provides two functions. First, the entire closed interstitial path; including the channels in the fittings, and all of the pipe segments can be tested by pressure or vacuum through tube 203 from a source of gas pressure or vacuum, not shown, to see if any leaks are present in the fittings, coupling assemblies and the like. Repairs can easily be made to any leaks upon installation of the system. If the system passes inspection, it is ready to use.

The second function is to connect the interstitial space $S_i$ via fitting 204 to tube 203 for filling the entire interstitial space of the system, including channels in the fittings, and other portions of the closed, continuous monitoring path or zone.

Even though particular embodiments of the present invention have been illustrated as described herein, it is not intended to limit the invention and changes and modifications may be made therein within the scope of the following claims.

I claim:

1. A pipe coupling assembly for use with at least one terminal end of a fluid transfer pipe having an inner tubular member for transferring fluid, an outer tubular member, and an interstitial space therebetween, comprising:
   a transition coupling for attachment to the pipe to provide a first path for fluid in the inner tubular member and a second path for the interstitial space; and
   a transition fitting for attachment to said transition coupling to provide separate pathways for fluid through the fitting;
   said transition coupling comprising a ferrule, a tubular sleeve for insertion within the inner tubular member, and a means for coupling the transition coupling to the transition fitting,
   said ferrule attachable to the outer tubular member at its terminal end and having a rearwardly directed annular circumferential lip, and a passageway aligned with the interstitial space,
   said tubular sleeve attachable to the inner tubular member at its terminal end and having an inner annular flange to cooperate with said annular lip to define a circumferentially extending chamber for alignment with said second path, said tubular sleeve having an opening therein for receiving said first path for fluid, and said coupling means attached to said ferrule for coupling engagement with said transition fitting,
   said transition fitting comprising a channel aligned for engagement with said chamber, and seal pockets aligned for sealing engagement with said annular lip on the ferrule and the inner annular flange on the tubular sleeve.

2. The assembly of claim 1, wherein said tubular sleeve is metal and said ferrule and said transition fitting are nondegradable plastic, said tubular sleeve being contained within said ferrule to prevent exposure of said metal tubular sleeve when said assembly is in said coupling engagement.

3. The assembly of claim 2, wherein said nondegradable plastic is selected from nylon and polyethylene.

4. The assembly of claim 2, wherein said metal tubular sleeve can be outwardly expanded to fixedly engage with the inner tubular member.

5. The assembly of claim 1, wherein said coupling means is a nondegradable plastic swivel nut and said transition fitting includes threads for coupling engagement with said nut.

6. The assembly of claim 1, wherein said seal pockets each include an O-ring, and said circumferential lip on the ferrule and inner annular flange on the inner tubular sleeve extend into said seal pockets for sealing engagement with said O-rings.

7. The assembly of claim 1, wherein said ferrule comprises teeth for deformational engagement with the outer tubular member.

8. The assembly of claim 1, wherein said tubular sleeve comprises teeth for deformational engagement with the inner tubular member.

9. The assembly of claim 1, which further comprises means for locking said coupling means to prevent disengagement of said coupling means due to vibrations.

10. The assembly of claim 1, wherein said transition fitting includes means for coupling to additional structure.

11. The assembly of claim 10, wherein said additional structure coupling means includes a tee fitting having three ends with transition fittings on at least two ends thereof.

12. The assembly of claim 11, wherein the third end of said tee fitting is adapted to receive a threaded riser pipe.

13. The assembly of claim 11, wherein said third end of said tee fitting also includes a transition fitting.

14. The assembly of claim 10, wherein said means for coupling to additional structure is selected from an elbow fitting, a tee fitting, a riser adapter, a shear valve adapter, a male adapter and a female adapter.

15. The assembly of claim 1, wherein said transition fitting includes a first channel forming a pass-through channel aligned along the axial direction of the transfer pipe.

16. The assembly of claim 15, wherein said transition fitting further includes a second channel forming a directional channel aligned in a direction other than said axial direction.

17. A pipe coupling assembly, comprising:
   a pipe for transferring fluid, said pipe having an inner tubular member for transferring fluid, an outer tubular member, and an interstitial space therebetween, a transition coupling for attachment to the pipe to provide a first path for fluid in the inner tubular member and a second path for the interstitial space; and a transition fitting for attachment to said transition coupling to provide separate pathways for fluid through the fitting;

said transition coupling comprising a ferrule, a tubular sleeve for insertion within the inner tubular member, and a means for coupling the transition coupling to the transition fitting, said ferrule attachable to the outer tubular member at its terminal end and having a rearwardly directed annular circumferential lip, and a passageway aligned with the interstitial space, said tubular sleeve attachable to the inner tubular member at its terminal end and having an inner annular flange to cooperate with said annular lip to define a circumferentially extending chamber for alignment with said second path, and said coupling means attached to said ferrule for coupling engagement with said transition fitting, said transition fitting comprising a channel aligned for engagement with said chamber, and seal pockets aligned for sealing engagement with said annular lip on the ferrule and the inner annular flange on the tubular sleeve, and wherein the tubular sleeve has an opening therein for receiving said first path for fluid.

18. The assembly of claim 17, wherein said tubular sleeve is metal and said ferrule and said transition fitting are nondegradable plastic, said tubular sleeve being contained within said ferrule to prevent exposure of said metal when said assembly is in said coupling engagement.

19. The assembly of claim 18, wherein said nondegradable plastic is selected from nylon and polyethylene.

20. The assembly of claim 18, wherein said metal tubular sleeve is internally expanded to fixedly engage with the inner tubular member.

21. The assembly of claim 17, wherein said coupling means is a nondegradable plastic swivel nut, and said transition fitting includes threads for coupling engagement with said nut.

22. The assembly of claim 17, wherein said seal pockets each include an O-ring, and said circumferential lip on the ferrule and inner annular flange on the inner tubular sleeve extend into said seal pockets for sealing engagement with said O-rings.

23. The assembly of claim 17, wherein said ferrule comprises teeth for deformational engagement with said outer tubular member.

24. The assembly of claim 17, wherein said tubular sleeve comprises teeth for deformational engagement with said inner tubular member upon expansion of said tubular sleeve.

25. The assembly of claim 17, which further comprises means for locking said coupling means to prevent disengagement of said coupling means due to vibrations.

26. The assembly of claim 17, wherein said transition fitting includes means for coupling to additional structure.

27. The assembly of claim 26, wherein said means for coupling to additional structure includes a tee fitting having three ends with transition fittings on at least two ends thereof.

28. The assembly of claim 27, wherein the third end of the said tee fitting is adapted to receive a threaded riser pipe.

29. The assembly of claim 27, wherein said third end of said tee fitting also includes a transition fitting.

30. The assembly of claim 26, wherein said means for coupling to additional structure is selected from an elbow fitting, a tee fitting, a riser adapter, a shear valve adapter, a male adapter and a female adapter.

31. The assembly of claim 17, wherein said transition fitting includes a first interstitial channel forming a pass-through channel aligned along the axial direction of said transfer pipe.

32. The assembly of claim 31, which further includes a second channel forming a directional channel aligned in a direction other than said axial direction.

* * * * *